:a33:(12) United States Patent
Kim et al.

(10) Patent No.: US 9,904,420 B2
(45) Date of Patent: Feb. 27, 2018

(54) DISPLAY DEVICE INTEGRATED WITH TOUCH SCREEN HAVING PHYSICALLY DIVIDED PLURALITY OF TOUCH ELRCTRODES AND DRIVING METHOD THEREOF

(71) Applicant: LG DISPLAY CO., LTD., Seoul (KR)

(72) Inventors: Hoon Bae Kim, Goyang-si (KR); Cheol Se Kim, Daegu (KR); Sung Su Han, Goyang-si (KR); Seong Kyu Kang, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 14/487,594

(22) Filed: Sep. 16, 2014

(65) Prior Publication Data

US 2015/0077370 A1   Mar. 19, 2015

(30) Foreign Application Priority Data

Sep. 17, 2013   (KR) ........................ 10-2013-0111614

(51) Int. Cl.
*G06F 3/041* (2006.01)
*G06F 3/044* (2006.01)

(52) U.S. Cl.
CPC ............ *G06F 3/044* (2013.01); *G06F 3/0412* (2013.01); *G06F 3/0416* (2013.01)

(58) Field of Classification Search
CPC ....... G06F 3/0416; G06F 3/0412; G06F 3/044
See application file for complete search history.

(56) References Cited

U.S. PATENT DOCUMENTS

| 7,859,521 | B2 | 12/2010 | Hotelling et al. |
| 8,154,673 | B2 * | 4/2012 | Li ............................ G06F 3/045 |
| | | | 345/173 |
| 8,970,532 | B2 * | 3/2015 | Kim .................... H01L 27/1259 |
| | | | 345/173 |
| 9,128,561 | B2 * | 9/2015 | Lee ........................ G06F 3/0416 |
| 2010/0073332 | A1 | 3/2010 | Gettemy et al. |

(Continued)

FOREIGN PATENT DOCUMENTS

| CN | 102096499 A | 6/2011 |
| CN | 102187265 A | 9/2011 |

(Continued)

*Primary Examiner* — Kwang-Su Yang
(74) *Attorney, Agent, or Firm* — Birch, Stewart, Kolasch & Birch, LLP

(57) ABSTRACT

Discussed is a display device integrated with touch screen. The display device includes a plurality of touch groups into which a plurality of touch electrodes are physically divided, a plurality of first driving electrode lines connected to a plurality of driving electrodes of a first touch group of the touch groups, a plurality of second driving electrode lines connected to a plurality of driving electrodes of a second touch group of the touch groups, a plurality of first receiving electrode lines connected to a plurality of receiving electrodes of the first touch group, a plurality of second receiving electrode lines connected to a plurality of receiving electrodes of the second touch group, a touch driving IC configured to supply a touch driving signal to the first and second driving electrode lines, and a touch sensing IC configured to sense touch signals of the first and second receiving electrode lines.

18 Claims, 11 Drawing Sheets

(56) References Cited

U.S. PATENT DOCUMENTS

| | | | |
|---|---|---|---|
| 2011/0141040 A1 | 6/2011 | Kang et al. | |
| 2013/0015906 A1* | 1/2013 | Yeh | G06F 3/044 327/517 |
| 2013/0016051 A1* | 1/2013 | Yeh | G06F 3/044 345/173 |
| 2013/0265282 A1* | 10/2013 | Nakagawa | G06F 3/044 345/174 |
| 2014/0104200 A1* | 4/2014 | Ahn | G06F 3/0416 345/173 |

FOREIGN PATENT DOCUMENTS

| | | |
|---|---|---|
| CN | 102880338 A | 1/2013 |
| WO | WO 2012/077576 A1 | 6/2012 |

\* cited by examiner

DISPLAY DEVICE INTEGRATED WITH TOUCH SCREEN HAVING PHYSICALLY DIVIDED PLURALITY OF TOUCH ELRCTRODES AND DRIVING METHOD THEREOF

CROSS-REFERENCE TO RELATED APPLICATIONS

This application claims the benefit under 35 U.S.C. § 119(a) of the Korean Patent Application No. 10-2013-0111614 filed on Sep. 17, 2013, the contents of which are hereby incorporated by reference in its entirety.

BACKGROUND

Field of the Invention

The present invention relates to a display device integrated with touch screen, and more particularly, to a display device integrated with touch screen and a driving method thereof, which can reduce a parasitic capacitance to enhance touch sensing performance.

Discussion of the Related Art

Display devices often include touch screens instead of a mouse or a keyboard to enable a user to directly input information with a finger or a pen that is applied to one of the flat panel display devices.

Touch screen are used in monitors such as navigations, industrial terminals, notebook computers, financial automation equipment, game machines, portable terminals such as portable phones, MP3 players, PDAs, PMPs, PSPs, portable game machines, DMB receivers, tablet personal computers (PCs), and home appliances such as refrigerators, microwave ovens, and washing machines.

A touch screen can be an in-cell type in which the touch screen is built in a cell of a display panel, an on-cell type in which the touch screen is disposed on a display panel, and an add-on type in which the touch screen is separately coupled to an upper portion of a display device, according to a structure. The in-cell type touch screen has an aesthetic design and is slim, and thus is becoming more prevalent.

FIG. 1 is a diagram schematically illustrating a related art display device integrated with a touch screen.

The related art display device integrated with the touch screen includes a display panel. The display device can also include a gate driver, a data driver, and a touch driver.

A plurality of pixels are formed in the display panel, and the touch screen is configured with a plurality of touch electrodes 10. In this case, the touch electrodes 10 and the pixels are formed in the display panel. A common electrode, which is formed for supplying a common voltage (Vcom) to each of the pixels, is used as the touch electrode 10.

Here, the plurality of touch electrodes 10 is divided into a plurality of driving electrodes (TX) 12, which receives a touch driving signal, and a plurality of receiving electrodes (RX) 14 that sense a touch. Each of the plurality of receiving electrodes 14 is formed in a one-piece line shape so as to have a bar shape from an upper portion to a lower portion of the display panel. The plurality of driving electrodes 12 are formed in units of a certain number of pixels.

A plurality of driving electrode lines 20, which supply a touch driving signal to the plurality of driving electrodes 12, are formed in the display panel. A plurality of driving electrodes 12, which are formed on the same horizontal line, are connected to each other by a corresponding driving electrode line 20. A plurality of receiving electrode lines 30, which sense capacitances of the plurality of receiving electrodes 14, are formed.

The touch driver is configured with a touch driving integrated circuit (IC) and a touch sensing IC. The touch driving IC is connected to the plurality of driving electrode lines 20, and supplies the touch driving signal to the plurality of driving electrodes 12. The touch sensing IC is connected to the plurality of receiving electrode lines 30, and senses a touch signal.

FIG. 2 is a diagram illustrating a method of driving the related art display device integrated with touch screen.

The display panel 10 which is integrated with the touch screen in an in-cell touch type temporally divides and drives a display operation and a touch sensing operation due to a structural characteristic in which the common electrode for display is used as the touch electrode.

The display operation may be performed in a partial period of one frame period by time-division driving the display panel in units of a frame, and the touch sensing operation may be performed in the other non-display period.

The display operation may be performed, in a partial period of one horizontal period (1H) by time-division driving the display panel in units of a line, and the touch sensing operation may be performed in the other non-display period.

In a display period, the display panel supplies data voltages based on image data and the common voltage to all the pixels to display an image. In a touch sensing period, the display panel supplies the touch driving signal to the plurality of driving electrodes TX1 to TXn, and senses touch signals of the plurality of receiving electrodes RX1 to RXn. A capacitance deviation occurs between a touched touch electrode and an untouched touch electrode, and the touch sensing IC senses the capacitance deviation between the touch electrodes to detect whether there is a touch and a touched position.

In the related art in-cell touch type display device, for the common electrode of the display panel to be used as the touch electrode 10, the plurality of driving electrode lines 20 and the plurality of receiving electrode lines 30 are formed to intersect each other, and thus, a parasitic capacitance "Cp" of the touch electrode 10 increases.

$$Cp = \varepsilon \frac{A}{d} \quad \text{[Equation 1]}$$

where Cp denotes a parasitic capacitance, $\varepsilon$ denotes a permittivity of the touch electrode, A denotes a cross-sectional area of the touch electrode, and d denotes a distance between the touch electrodes. The parasitic capacitance "Cp" is inversely proportional to the distance "d" between the touch electrodes, and increases in proportion to the cross-sectional area "A" of the touch electrode.

In the in-cell touch type, since the driving electrode 12 and the receiving electrode 14 are formed on the same plane, a distance between electrodes is short, and since the plurality of driving electrode lines 20 and the plurality of receiving electrode lines 30 are formed in a cell, the parasitic capacitance "Cp" increases. As a screen size of the display panel increases, the parasitic capacitance "Cp" increases exponentially, and when the parasitic capacitance "Cp" increases, a sensing performance of the touch IC decreases. The decreased sensing performance of the touch IC can be caused by enlarged sizes of the in-cell touch type display device.

SUMMARY

Accordingly, the present invention is directed toward providing a display device integrated with a touch screen and a driving method thereof that substantially obviate one or more problems due to limitations and disadvantages of the related art.

An aspect of the present invention is directed to providing a display device integrated with touch screen and a driving method thereof, which can reduce a parasitic capacitance of a display panel integrated with a touch screen to enhance touch sensing performance.

In addition to the aforesaid objects of the present invention, other features and advantages of the present invention will be described below, but will be clearly understood by those skilled in the art from descriptions below.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a display device integrated with a touch screen, in which a plurality of touch electrodes are formed in a display panel in an in-cell touch type, the display device including: a plurality of touch groups into which the plurality of touch electrodes are physically divided; a plurality of first driving electrode lines connected to a plurality of driving electrodes of a first touch group of the plurality of touch groups; a plurality of second driving electrode lines connected to a plurality of driving electrodes of a second touch group of the plurality of touch groups; a plurality of first receiving electrode lines connected to a plurality of receiving electrodes of the first touch group; a plurality of second receiving electrode lines connected to a plurality of receiving electrodes of the second touch group; a touch driving IC configured to supply a touch driving signal to the plurality of first driving electrode lines and the plurality of second driving electrode lines; and a touch sensing IC configured to sense touch signals of the plurality of first receiving electrode lines and touch signals of the plurality of second receiving electrode lines.

In another aspect of the present invention, there is provided a method of driving a display device integrated with a touch screen in which a plurality of touch electrodes are formed in a display panel in an in-cell touch type, including: during a display period, displaying an image in a plurality of pixels formed in the display panel; during a non-display period, supplying a touch driving signal to a plurality of driving electrodes connected to a plurality of driving electrode lines of a first touch group, and simultaneously supplying the touch driving signal to a plurality of driving electrodes connected to a plurality of driving electrode lines of a second touch group, wherein the first and second touch groups are included in a plurality of touch groups into which the plurality of touch electrodes are physically divided; and sensing touch signals of a plurality of receiving electrode lines of the first touch group, and simultaneously sensing touch signals of a plurality of receiving electrode lines of the second touch group.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Figure 1:
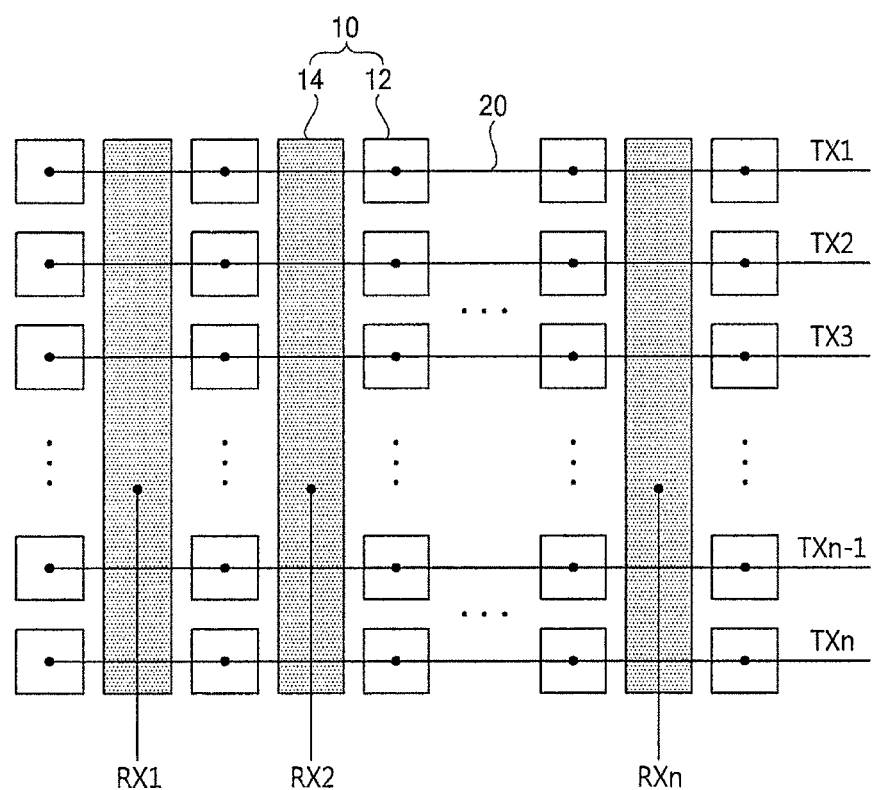
FIG. 1 is a diagram schematically illustrating a related art display device integrated with a touch screen.
Figure 2:
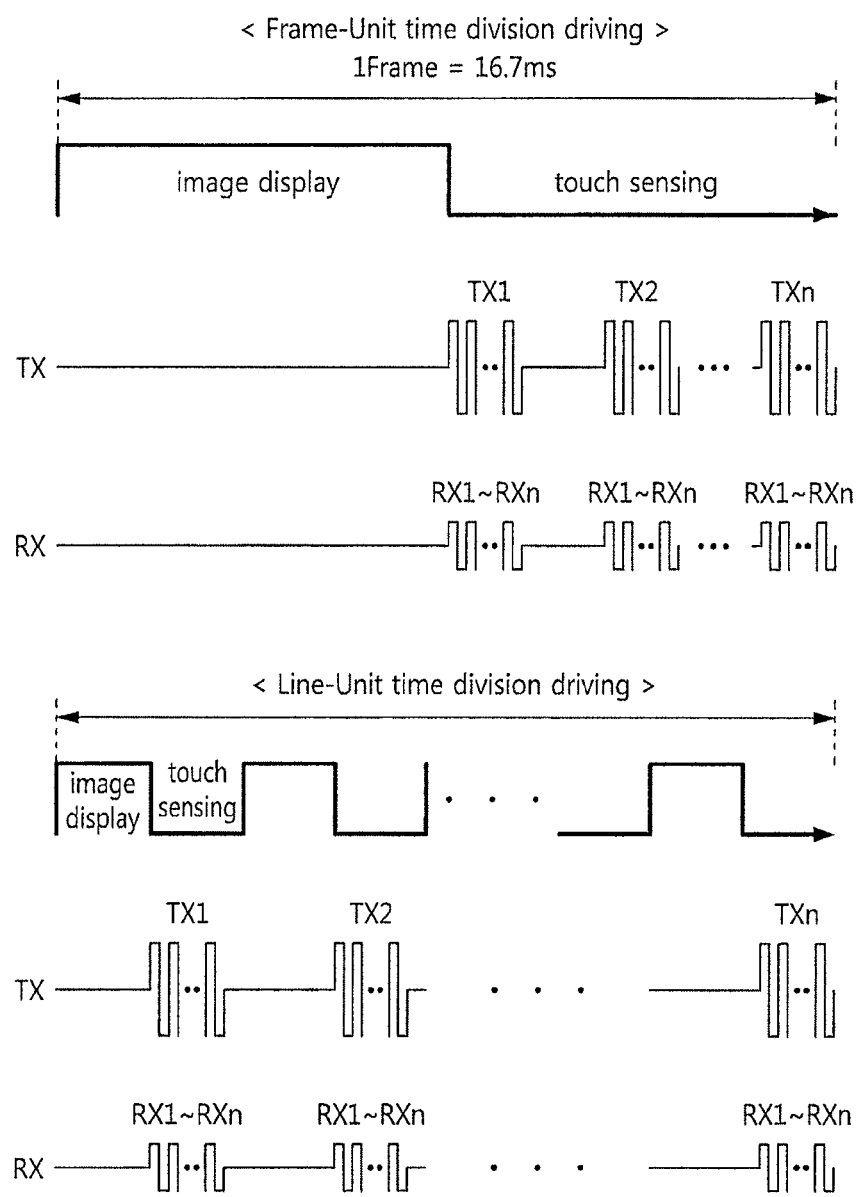
FIG. 2 is a diagram illustrating a method of driving the related art display device integrated with a touch screen.

Reference will now be made in detail to the exemplary embodiments of the present invention, examples of which are illustrated in the accompanying drawings. Wherever possible, the same reference numbers will be used throughout the drawings to refer to the same or like parts.

Hereinafter, a display device integrated with a touch screen and a driving method thereof according to embodiments of the present invention will be described in detail with reference to the accompanying drawings. Like reference numerals refer to like elements throughout. In the below description, elements and functions that are irrelevant to the essentials of the present invention and have been known to those skilled in the art may not be provided.

Before providing a detailed description with reference to the drawings, LCD devices have been variously developed in a twisted nematic (TN) mode, a vertical alignment (VA) mode, an in-plane switching (IPS) mode, and a fringe field switching (FFS) mode according to a scheme of adjusting the alignment of liquid crystal.

Among the modes, the IPS mode and the FFS mode are modes in which a plurality of pixel electrodes and common electrode are arranged on a lower substrate (TFT array substrate), and the alignment of liquid crystal is adjusted by vertical electric fields between the pixel electrodes and the common electrodes.

Particularly, the IPS mode is a mode in which a plurality of pixel electrodes and common electrodes are alternately arranged in parallel, and horizontal electric fields are respectively generated between the pixel electrodes and the common electrodes, thereby adjusting the alignment of liquid crystal.

The FFS mode is a mode in which a pixel electrode and a common electrode are formed in plurality to be separated from each other with an insulating layer therebetween. In this case, one electrodes of the pixel electrodes and common electrodes are formed in a plate shape or a pattern, and the other electrodes are formed in a finger shape. The FFS mode is a mode that adjusts the alignment of liquid crystal with fringe fields generated between the pixel electrodes and common electrodes.

A TN-mode liquid crystal panel, a VA-mode liquid crystal panel, an IPS-mode liquid crystal panel, and an FFS-mode liquid crystal panel may be applied to a display device integrated with a touch screen. In a detailed description on the present invention, as an example, an FFS-mode liquid crystal panel integrated with a touch screen displays an image and senses a touch.

Figure 3:
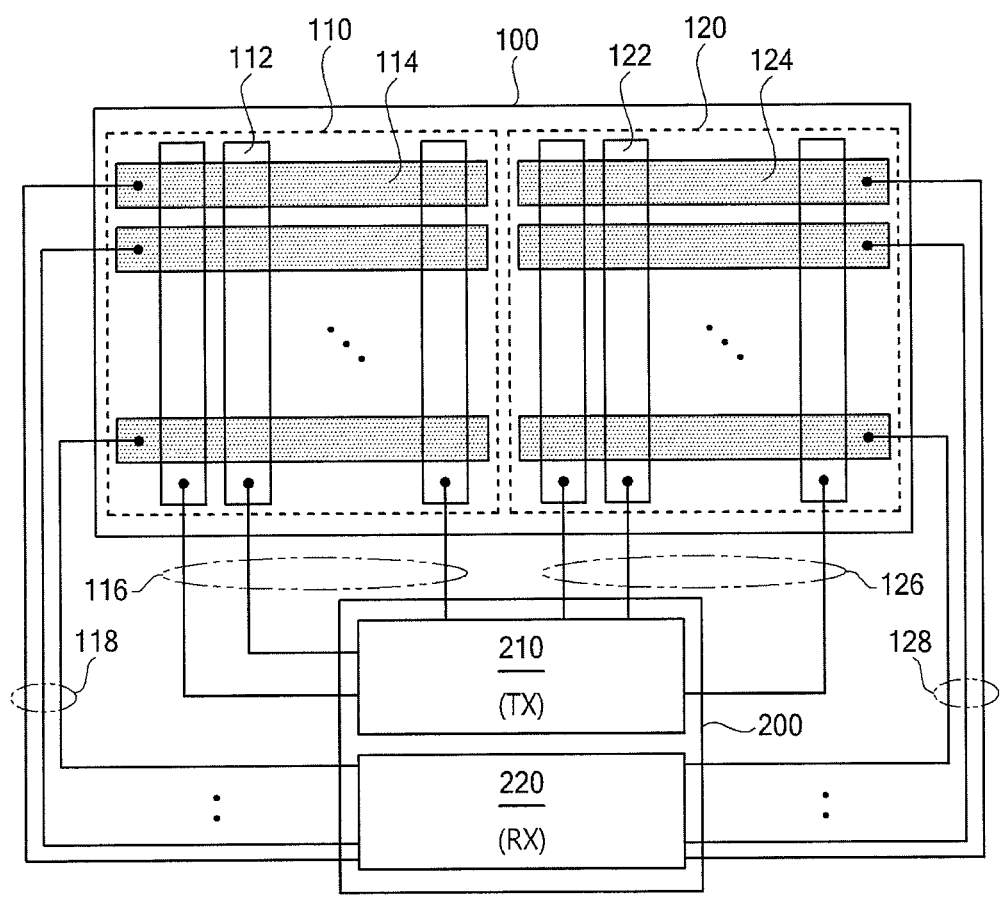
FIG. 3 is a diagram schematically illustrating a display device integrated with a touch screen according to a first embodiment of the present invention.

Next, FIG. 3 is a diagram schematically illustrating a display device integrated with a touch screen according to a first embodiment of the present invention. The display device integrated with the touch screen according to the first embodiment of the present invention includes a display panel 100. The display device can also include a timing controller, a gate driver, a data driver, and a touch driver 200. The display device integrated with the touch screen according to the first embodiment of the present invention can also include a backlight unit that supplies light to the display panel 100, a backlight driver, and a power supply.

Here, the timing controller, the gate driver, and the data driver may be provided as separate IC chips, or may be implemented as a single IC chip. The gate driver may be integrated on a lower substrate of the display panel 100 in an amorphous silicon gate (ASG) type or a gate-in panel (GIP) type.

The display panel 100 includes an upper substrate (a color filter array substrate), a lower substrate (a thin film transistor (TFT) array substrate), and a liquid crystal layer disposed between the upper substrate and the lower substrate.

Red (R), green (G), and blue (B) color filters, which respectively convert lights incident from respective pixels into color lights to display a color image, are formed on the upper substrate. A plurality of gate lines and a plurality of data lines are formed on the lower substrate so as to intersect each other, and thus, a plurality of pixels are defined.

The plurality of pixels are arranged in a matrix type, and one unit pixel may be configured with three pixels RGB or four pixels RGBW. A TFT that is a switching element, a storage capacitor, a pixel electrode, and a common electrode are formed on the lower substrate.

The alignment of liquid crystal is adjusted with an electric field generated by a difference voltage between a data voltage (which is supplied to the pixel electrode) and a common voltage Vcom supplied to the common electrode. A transmittance of the light irradiated from the backlight unit is adjusted by adjusting the alignment of the liquid crystal, thereby displaying an image.

In the display device integrated with the touch screen according to the first embodiment of the present invention, a plurality of touch electrodes are divided into a plurality of touch groups 110 and 120 so as to reduce a parasitic capacitance "Cp" which increases because a touch electrode is formed in an in-cell touch type. In this case, each of the plurality of touch groups 110 and 120 is driven as one touch screen.

In detail, a plurality of first touch electrodes which are disposed at the left with respect to the center of the display panel 100 constitute a first touch group 110. A plurality of touch electrodes constituting the first touch group 110 are divided into a plurality of driving electrodes (TX) 112, which receives a touch driving signal (TX signal), and a plurality of receiving electrodes (RX) 114 that sense a touch.

A plurality of second touch electrodes which are disposed at the right with respect to the center of the display panel 100 constitute a second touch group 120. A plurality of touch electrodes constituting the second touch group 120 are divided into a plurality of driving electrodes (TX) 122, which receives the touch driving signal, and a plurality of receiving electrodes (RX) 124 that sense a touch.

Here, a common electrode which is formed for supplying the common voltage Vcom to each pixel may be used as each of the receiving electrodes 114 and 124, and the driving electrodes 112 and 122 may be separately formed. However, the present invention is not limited thereto. For example, the common electrode which is formed for supplying the common voltage Vcom to each pixel may be used as each of the driving electrodes 112 and 122, and the receiving electrodes 114 and 124 may be separately formed.

The driving electrodes 112 and 122 and the receiving electrodes 114 and 124 are formed on different layers, and the receiving electrodes 114 and 124 are formed under the driving electrodes 112 and 122. However, the present invention is not limited thereto. For example, the driving electrodes 112 and 122 and the receiving electrodes 114 and 124 may be switched in their disposed positions, and thus, the driving electrodes 112 and 122 are formed under the receiving electrodes 114 and 124.

A plurality of driving electrode lines 116 and 126 and a plurality of receiving electrode lines 118 and 128 are formed in the display panel 100.

A plurality of first driving electrode lines 116 are for supplying the touch driving signal to the plurality of driving electrodes 112 constituting the first touch group 110. One side of each of the plurality of first driving electrode lines 116 is connected to the plurality of driving electrodes 112 constituting the first touch group 110, and the other side is connected to a touch driving IC 210.

A plurality of first receiving electrode lines 118 are for sensing touch signals from the plurality of receiving electrodes 114 constituting the first touch group 110. One side of each of the plurality of first receiving electrode lines 118 is connected to the plurality of receiving electrodes 114 constituting the first touch group 110, and the other side is connected to a touch sensing IC 220.

A plurality of second driving electrode lines 126 are for supplying the touch driving signal to the plurality of driving electrodes 122 constituting the second touch group 120. One side of each of the plurality of second driving electrode lines 126 is connected to the plurality of driving electrodes 122 constituting the second touch group 120, and the other side is connected to the touch driving IC 210.

A plurality of second receiving electrode lines 128 are for sensing touch signals from the plurality of receiving electrodes 124 constituting the second touch group 120. One side of each of the plurality of second receiving electrode lines 128 is connected to the plurality of receiving electrodes 124 constituting the second touch group 120, and the other side is connected to the touch sensing IC 220.

Here, the driving electrode lines 116 and 126 and the receiving electrode lines 118 and 128 are formed on different layers and on the lower substrate of the display panel 100.

The display device integrated with the touch screen according to the first embodiment of the present invention includes a touch driver 200. The touch driver 200 is configured with the touch driving IC 210 and the touch sensing IC 220.

The touch driving IC 210 is connected to the first driving electrode lines 116 of the first touch group 110 and the second driving electrode lines 126 of the second touch group 120. The touch driving IC 210 supplies the touch driving signal to the driving electrodes 112 of the first touch group 110 and the driving electrodes 122 of the second touch group 120.

The touch sensing IC 220 is connected to the first receiving electrode lines 118 of the first touch group 110 and the second receiving electrode lines 128 of the second touch group 120. The touch sensing IC 220 senses touch signals of the first receiving electrode lines 118 of the first touch group 110 and touch signals of the second receiving electrode lines 128 of the second touch group 120.

As described above, the first and second touch groups 110 and 120 are formed by physically dividing (two division) all the touch electrodes. In a non-display period, the first and second touch groups 110 and 120 are driven as separate touch screens. The first touch group 110 senses a touch of an area corresponding to a left side (i.e., half (½)) of a whole screen of the display panel 100. The second touch group 120 senses a touch of an area corresponding to a right side (i.e., the other half (½)) of a whole screen of the display panel 100.

In the display device integrated with the touch screen according to the first embodiment of the present invention which includes the above-described elements, the plurality of touch groups 110 and 120 are formed by physically dividing the touch electrodes of the display panel 100, thereby reducing the parasitic capacitance "Cp" of each of the touch electrodes. Therefore, since the parasitic capacitance "Cp" of each of the touch electrodes is reduced, touch sensing performance can be enhanced. Also, a size of the display panel 100 which is manufactured in an in-cell touch type can be enlarged.

In the display panel 100, by using the in-cell touch type, the elements of each pixel for display and the elements of the touch screen for touch detection are integrated and formed on the lower substrate. Accordingly, a display operation and a touch sensing operation are temporally divided and performed.

Figure 4:
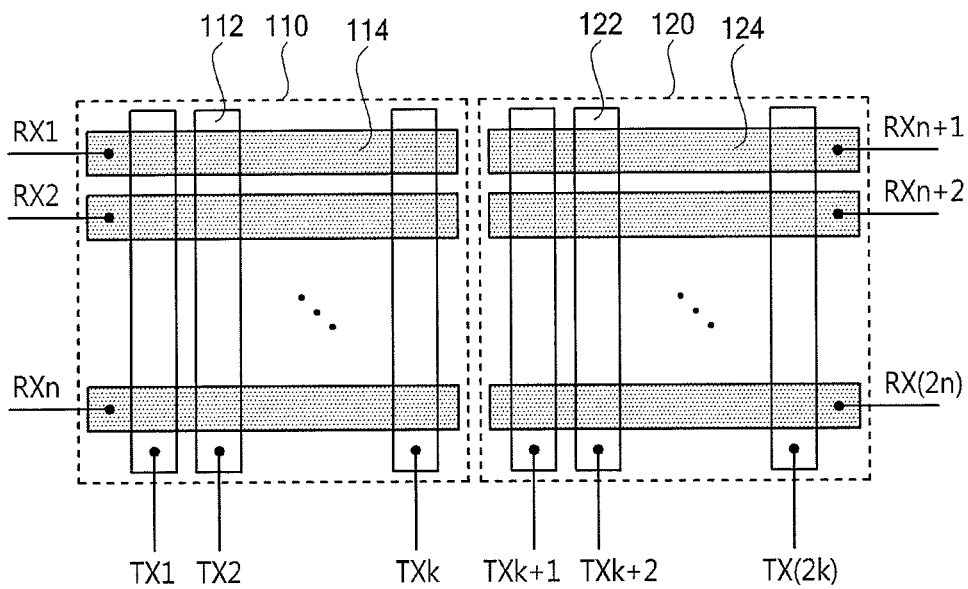
FIG. 4 is a diagram illustrating a display device integrated with a touch screen according to a second of the present invention and a frame-unit time division driving method.
Figure 4:
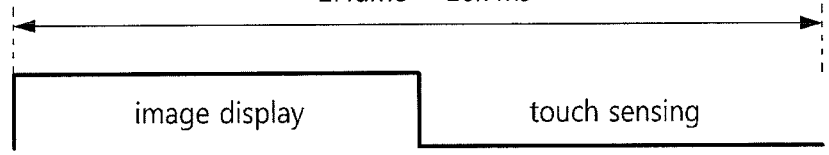
Figure 4:
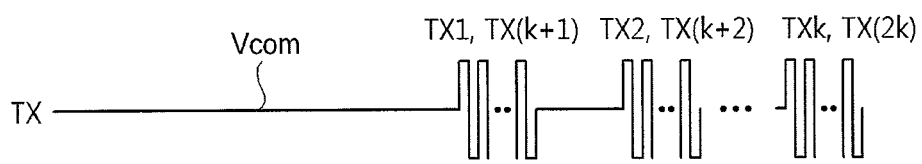
Figure 4:
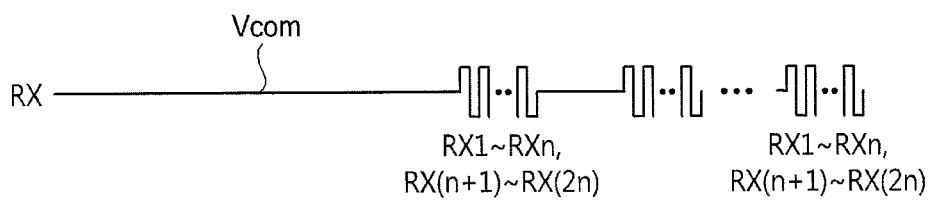

Next, FIG. 4 is a diagram illustrating a display device integrated with a touch screen according to a second of the present invention and a frame-unit time division driving method. One frame may be divided into a display period and a touch sensing period. A display operation and a touch sensing operation may be performed.

In the display period, the display device supplies a data voltage based on image data to the pixel electrode of each pixel, and supplies the common voltage to the common electrode, thereby displaying an image.

In the touch sensing period that is a non-display period, the display device drives the common electrodes of all the pixels as the touch electrodes of the first touch group 110 and the touch electrodes of the second touch group 120 to detect whether there is a touch and a touched position.

Here, the touch driving IC 210 of the touch driver 200 simultaneously supplies the touch driving signal to the driving electrodes 112 of the first touch group 110 and the driving electrodes 122 of the second touch group 120. In this case, the touch driving signal is sequentially supplied in units of a driving electrode line TX.

In detail, the touch driving IC 210 simultaneously supplies the touch driving signal to a first driving electrode line TX1 of the first touch group 110 and a first driving electrode line TX(k+1) of the second touch group 120. The touch driving signal is supplied to a driving electrode connected to the first driving electrode line TX1 of the first touch group 110. Simultaneously, the touch driving signal is supplied to a driving electrode connected to the first driving electrode line TX(k+1) of the second touch group 120.

Subsequently, the touch driving IC 210 simultaneously supplies the touch driving signal to a second driving electrode line TX2 of the first touch group 110 and a second driving electrode line TX(k+2) of the second touch group 120. The touch driving signal is supplied to a driving electrode connected to the second driving electrode line TX2 of the first touch group 110. Simultaneously, the touch driving signal is supplied to a driving electrode connected to the second driving electrode line TX(k+2) of the second touch group 120. In this way, the touch driving IC 210 sequentially supplies the touch driving signal to a last driving electrode line TXk of the first touch group 110 and a last driving electrode line TX(2k) of the second touch group 120. The touch driving signal is supplied to a driving electrode up to the last driving electrode line TXk of the first touch group 110. Simultaneously, the touch driving signal is supplied to a driving electrode up to the last driving electrode line TX(2k) of the second touch group 120.

The touch sensing IC 220 of the touch driver 200 senses touch signals from the plurality of receiving electrode lines 118 respectively connected to the receiving electrodes 114 of the first touch group 110. Also, the touch sensing IC 220 of the touch driver 200 senses touch signals from the plurality of receiving electrode lines 128 respectively connected to the receiving electrodes 124 of the second touch group 110. In this case, the touch sensing IC 220 of the touch driver 200 simultaneously senses the first touch group 110 and the second touch group 120, and an operation of sensing the touch signals of the first and second touch groups 110 and 120 is sequentially performed in units of a receiving electrode line RX.

In detail, the touch sensing IC 220 senses a touch signal of a first receiving electrode line RX1 of the first touch group 110. Simultaneously, the touch sensing IC 220 senses a touch signal of a first receiving electrode line RX(n+1) of the second touch group 120.

Subsequently, the touch sensing IC 220 senses a touch signal of a second receiving electrode line RX2 of the first touch group 110. Simultaneously, the touch sensing IC 220 senses a touch signal of a second receiving electrode line RX(n+2) of the second touch group 120. In this way, the touch sensing IC 220 senses a touch signal up to a last receiving electrode line RXn of the first touch group 110, and simultaneously senses a touch signal up to a last receiving electrode line RX(2n) of the second touch group 120.

In this case, the touch sensing IC 220 sequentially senses the touch signals of the first and second touch groups 110 and 120 in units of one line. The touch sensing IC 220 senses touch signals by receiving electrode line of the first touch group 110 and receiving electrode line of the second touch group 120 to detect whether there is a touch and a touched position of a screen.

Figure 5:
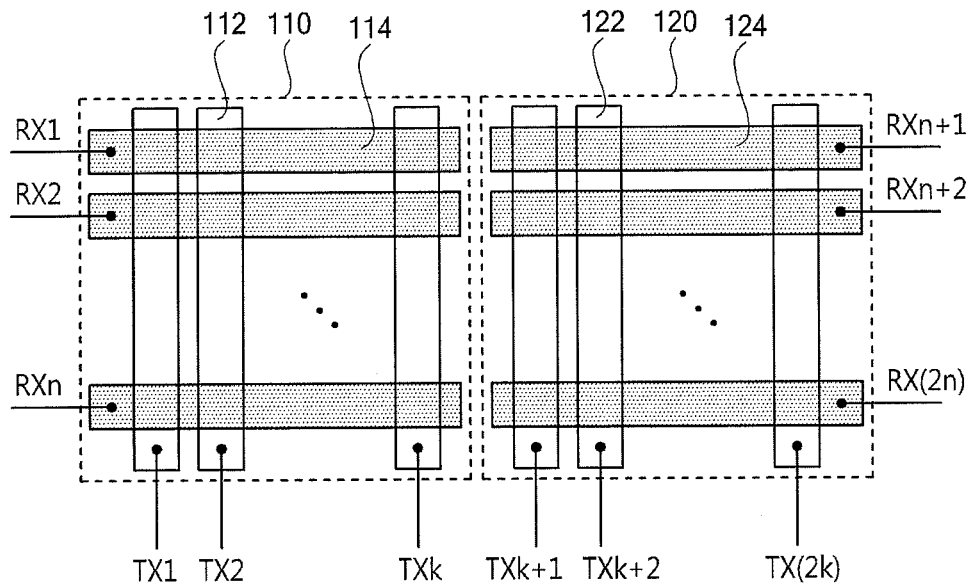
FIGS. 5 and 6 are diagrams illustrating a display device integrated with a touch screen according to a third of the present invention and a line-unit time division driving method.
Figure 5:
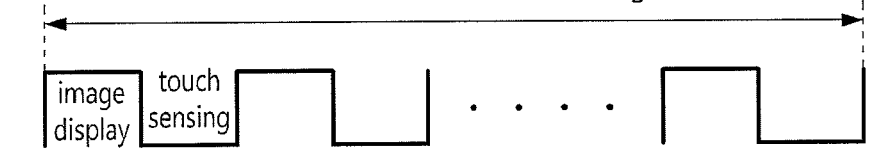
Figure 5:
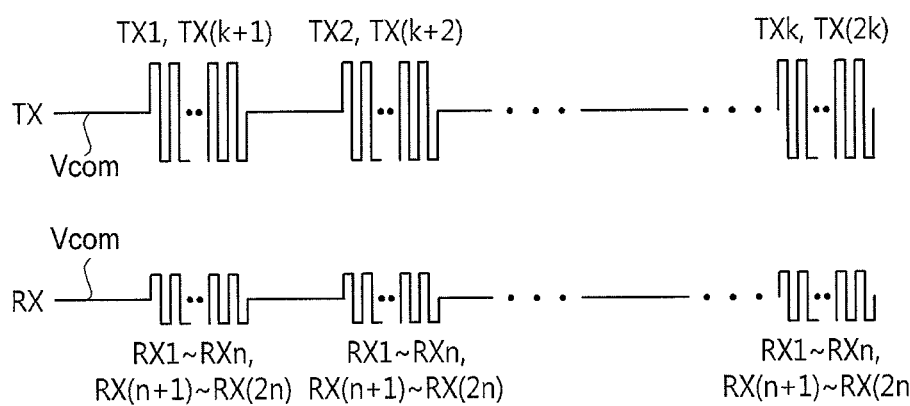
Figure 6:
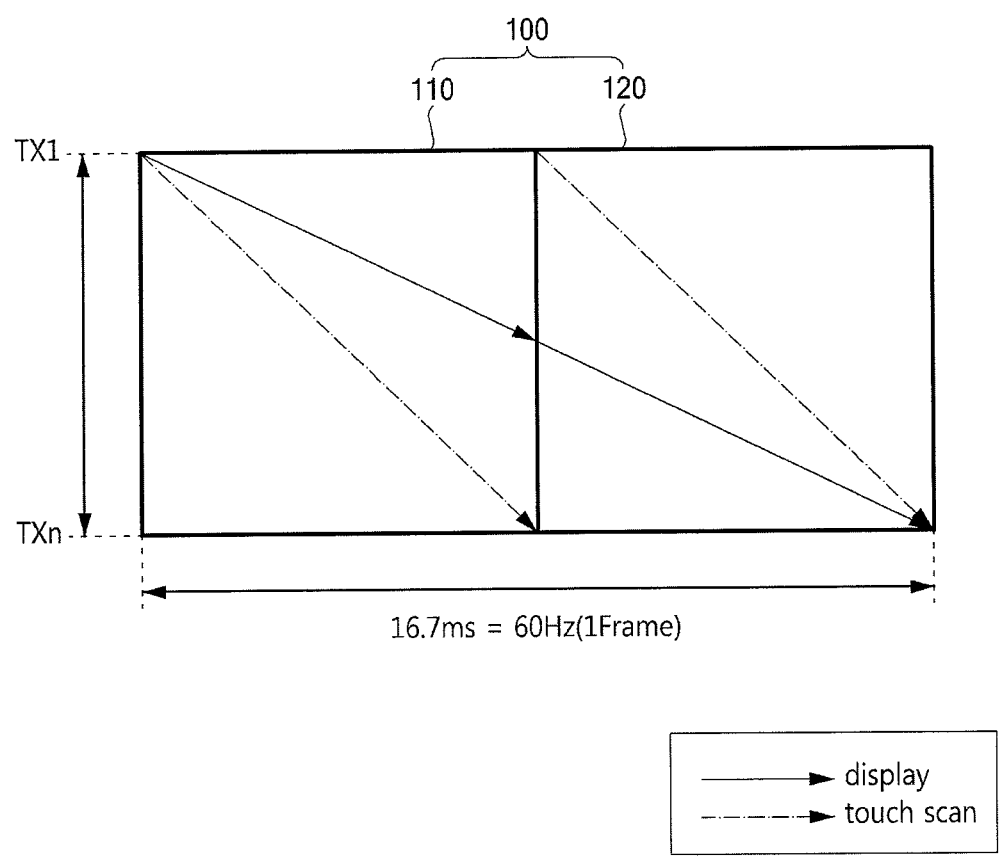

Next, FIGS. 5 and 6 are diagrams illustrating a display device integrated with a touch screen according to a third of the present invention and a line-unit time division driving method. By time-division driving the display panel in units of a line, a display operation may be performed in a partial period of one horizontal period (1H), and a touch sensing operation may be performed in the other non-display period.

In a display period of one horizontal period (1H), the display device supplies a data voltage based on image data to the pixel electrode of each pixel, and supplies the common voltage to the common electrode, thereby displaying an image.

In the touch sensing period other than the display period of one horizontal period (1H), the display device drives the common electrodes of all the pixels as the touch electrodes of the first touch group 110 and the touch electrodes of the second touch group 120 to sense a touch.

Here, the touch driving IC 210 of the touch driver 200 simultaneously supplies the touch driving signal to the driving electrodes 112 of the first touch group 110 and the driving electrodes 122 of the second touch group 120 in the touch sensing period that is the non-display period of one horizontal period (1H). In this case, the touch driving signal is sequentially supplied in units of a driving electrode line TX.

In detail, the touch driving IC 210 simultaneously supplies the touch driving signal to a first driving electrode line TX1 of the first touch group 110 and a first driving electrode line TX(k+1) of the second touch group 120. The touch driving signal is supplied to a plurality of driving electrodes connected to the first driving electrode line TX1 of the first touch group 110. Simultaneously, the touch driving signal is supplied to a plurality of driving electrodes connected to the first driving electrode line TX(k+1) of the second touch group 120.

Subsequently, the touch driving IC 210 simultaneously supplies the touch driving signal to a second driving electrode line TX2 of the first touch group 110 and a second driving electrode line TX(k+2) of the second touch group 120. The touch driving signal is supplied to a plurality of driving electrodes connected to the second driving electrode line TX2 of the first touch group 110. Simultaneously, the touch driving signal is supplied to a plurality of driving electrodes connected to the second driving electrode line TX(k+2) of the second touch group 120.

The touch driving IC 210 sequentially supplies the touch driving signal up to a last driving electrode line TXk of the first touch group 110 and a last driving electrode line TX(2k) of the second touch group 120.

The touch driving signal is supplied to a plurality of driving electrodes connected to a last driving electrode line TXk of the first touch group 110. Simultaneously, the touch driving signal is supplied to a plurality of driving electrodes connected to a last driving electrode line TX(2k) of the second touch group 120. In this way, the touch driving signal is sequentially supplied to the driving electrodes of the first touch group 110 and the driving electrodes of the second touch group 120 from a first horizontal period to a last horizontal period in units of one line.

In the touch sensing period that is the non-display period in one horizontal period, the touch sensing IC 220 of the touch driver 200 simultaneously senses the touch signals of the receiving electrode lines 118 of the first touch group 110 and the touch signals of the receiving electrode lines 128 of the second touch group 120.

In this case, an operation of sensing the touch signals of the first and second touch groups 110 and 120 is sequentially performed in units of a receiving electrode line RX at every one horizontal period. The touch sensing IC 220 sequentially senses the touch signals of all the receiving electrodes of the first and second groups 110 and 120 in units of one line.

In detail, in the first horizontal period, the touch sensing IC 220 senses a touch signal of a first receiving electrode line RX1 of the first touch group 110. Simultaneously, the touch sensing IC 220 senses a touch signal of a first receiving electrode line RX(n+1) of the second touch group 120.

Subsequently, in a second horizontal period, the touch sensing IC 220 senses a touch signal of a second receiving electrode line RX2 of the first touch group 110. Simultaneously, the touch sensing IC 220 senses a touch signal of a second receiving electrode line RX(n+2) of the second touch group 120.

Subsequently, in the last horizontal period, the touch sensing IC 220 senses a touch signal up to a last receiving electrode line RXn of the first touch group 110. Simultaneously, the touch sensing IC 220 senses a touch signal up to a last receiving electrode line RX(2n) of the second touch group 120.

A method of sensing the touch signals of the receiving electrode lines of the first touch group 110 and the touch signals of the receiving electrode lines of the second touch group 120 during each horizontal period from a third horizontal period to the last horizontal period is the same as the above-described method, and thus, its detailed description is not provided. In this way, the touch sensing IC 220 sequentially senses the touch signals of the receiving electrode lines of the first touch group 110 and the touch signals of the receiving electrode lines of the second touch group 120 in units of one line at every one horizontal period from the first horizontal period to the last horizontal period.

The touch sensing IC 220 senses touch signals by receiving electrode line of the first touch group 110 and receiving electrode line of the second touch group 120 to detect whether there is a touch and a touched position of a screen.

In the display device integrated with the touch screen and the driving method thereof according to the third embodiment of the present invention, the touch electrodes of the display panel 100 are physically divided into the plurality of touch groups 110 and 120, thereby reducing the parasitic capacitance "Cp" of each touch electrode.

Next, in FIG. 6, when a display operation of displaying an image at 60 Hz is performed, a touch sensing operation is performed at 120 Hz. In this way, the first touch group 110 disposed in a left screen of the display panel 100 and the second touch group 120 disposed in a right screen are simultaneously driven, and thus, the touch sensing operation is performed in units of two channels in one touch section.

Figure 7:
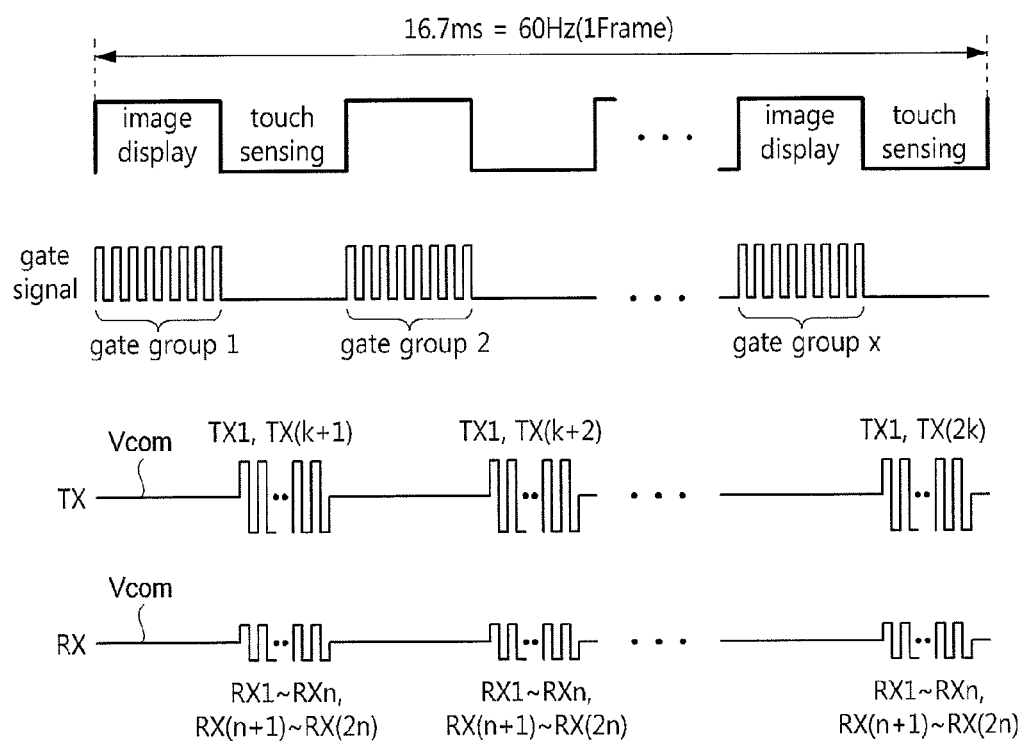
FIG. 7 is a diagram illustrating another example of a touch driving method according to a fourth of the present invention.

Next, FIG. 7 is a diagram illustrating another example of a touch driving method according to a fourth of the present invention. A display operation may be performed in a plurality of horizontal periods, and then, a touch sensing operation may be performed. A certain number of gate lines constitute one gate group. For example, when the total number of gate lines is 1280 and one gate group is formed in units of 20 gate lines, a total of 64 gate groups may be formed.

Here, driving electrodes 112 and 122 equal to the number of gate groups are respectively formed in the first and second touch groups 110 and 120. That is, 64 driving electrodes 112 and 122 are respectively formed in the first and second touch groups 110 and 120.

One grate group is driven to display an image, and then, the touch driving signal is supplied to one driving electrode 112 of the first touch group 110 and one driving electrode 122 of the second touch group 120. Touch signals of all receiving electrode lines of the first and second touch groups are sensed. That is, an image is displayed in units of a gate group, and the tough driving signal is sequentially supplied to the driving electrode 112 of the first touch group 110 and the driving electrode 122 of the second touch group 120 in synchronization with driving of the gate group in the non-display period. Whenever the tough driving signal is supplied to the driving electrode 112 of the first touch group 110 and the driving electrode 122 of the second touch group 120, touch signals of all receiving electrode lines 118 of the first touch group 110 and touch signals of all receiving electrode lines 128 of the second touch group 120 are sensed.

For example, a first gate group is driven to display an image, and then, the touch driving IC 210 supplies the touch driving signal to a first driving electrode of the first touch group 110 and a first driving electrode of the second touch group 120. Also, the touch sensing IC 220 simultaneously senses the touch signals of all the receiving electrode lines 118 of the first touch group 110 and the touch signals of all the receiving electrode lines 128 of the second touch group 120 in a non-display period after the first gate group is driven.

Subsequently, a second gate group is driven to display an image, and then, the touch driving IC 210 supplies the touch driving signal to the first driving electrode of the first touch group 110 and a second driving electrode of the second touch group 120. Also, the touch sensing IC 220 simultaneously senses the touch signals of all the receiving electrode lines 118 of the first touch group 110 and the touch signals of all the receiving electrode lines 128 of the second touch group 120 in a non-display period after the second gate group is driven. In this way, all the gate groups are sequentially driven up to a last gate group to display an image, and the touch driving signal is sequentially supplied up to a last driving electrode of the first touch group 110 and a last driving electrode of the second tough group 120 at every non-display period. Whenever the touch driving signal is supplied to each driving electrode, the touch signals of all the receiving electrode lines of the first and second touch groups 110 and 120 are sensed.

As described above, the touch electrodes of the display panel 100 are physically divided into the plurality of touch groups 110 and 120. The first touch group 110 disposed in a left screen of the display panel 100 and the second touch group 120 disposed in a right screen are simultaneously driven, and thus, the touch sensing operation is performed in units of two channels in one touch section.

Figure 8:
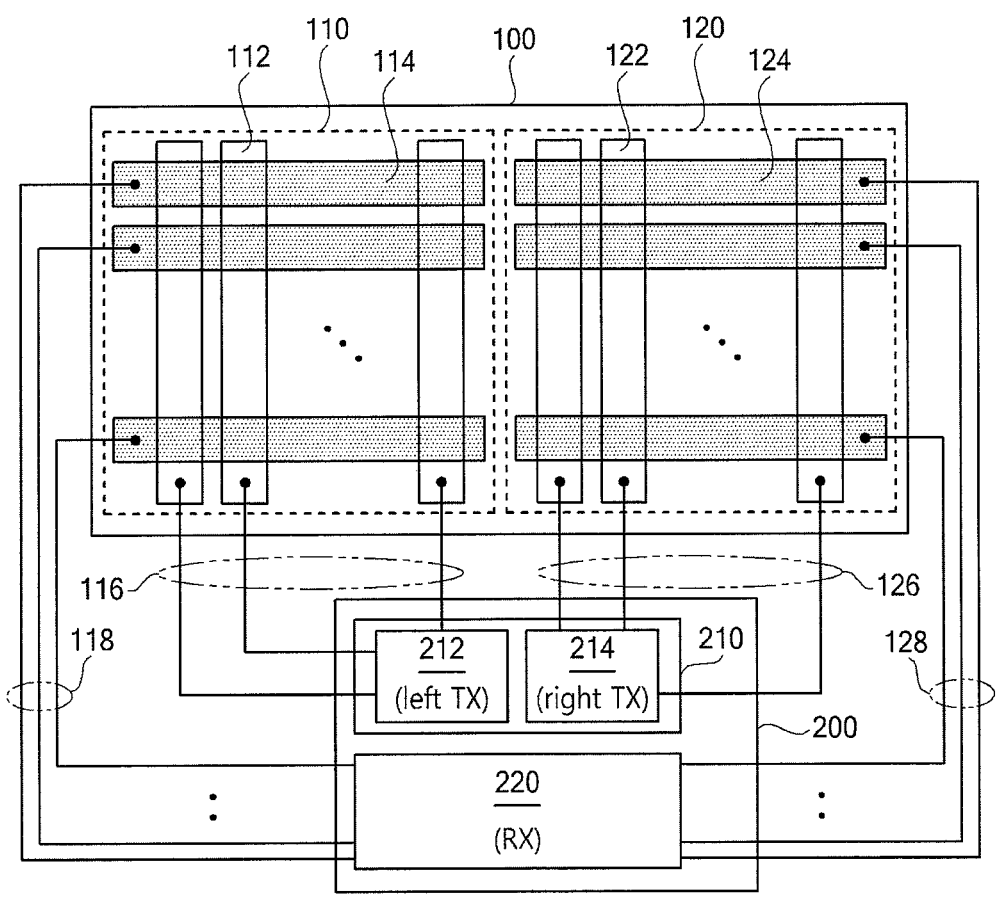
FIG. 8 is a diagram illustrating a display device integrated with a touch screen according to a fifth of the present invention.

Next, FIG. 8 is a diagram illustrating a display device integrated with a touch screen according to a fifth of the present invention. The display device integrated with a touch screen according to the fifth embodiment of the present invention includes a touch driver 200 that is configured with two touch driving ICs 212 and 214 and one touch sensing IC 220. A touch electrode, a plurality of driving electrode lines 116 and 126, and a plurality of receiving electrode lines 118 and 128, which are formed in a display panel 100, are the same as or similar to the embodiments described above with reference to FIGS. 3 to 7.

The frame-unit time division driving method described above with reference to FIG. 4 and the line-unit time division driving method described above with reference to FIGS. 5 and 7 may be applied to the display device integrated with the touch screen according to the fifth embodiment of the present invention.

The first touch driving IC 212 is connected to first driving electrode lines 116 of a first touch group 110 which is formed at the left of a screen of the display panel 100. The second touch driving IC 214 is connected to second driving electrode lines 126 of a second touch group 120 which is formed at the right of the screen of the display panel 100.

The first and second touch driving ICs 212 and 214 simultaneously supply a touch driving signal in units of one driving electrode line in a state where an operating time is synchronized therebetween. In detail, the first touch driving IC 212 supplies a touch driving signal to a first driving electrode line TX1 of the first touch group 110. Simultaneously, the second touch driving IC 214 supplies the touch driving signal to a first driving electrode line TX(k+1) of the second touch group 120.

The touch driving signal is supplied to a driving electrode connected to the first driving electrode line TX1 of the first touch group 110. Simultaneously, the touch driving signal is supplied to a driving electrode connected to the first driving electrode line TX(k+1) of the second touch group 120.

Subsequently, the first touch driving IC 212 supplies the touch driving signal to a second driving electrode line TX2 of the first touch group 110. Simultaneously, the second touch driving ICA 214 supplies the touch driving signal to a second driving electrode line TX(k+2) of the second touch group 120. The touch driving signal is supplied to a driving electrode connected to the second driving electrode line TX2 of the first touch group 110. Simultaneously, the touch driving signal is supplied to a driving electrode connected to the second driving electrode line TX(k+2) of the second touch group 120. In this way, the first touch driving IC 212 sequentially supplies the touch driving signal up to a last driving electrode line TXk of the first touch group 110. Also, the second touch driving IC 214 sequentially supplies the touch driving signal up to a last driving electrode line TX(2k) of the second touch group 120 in synchronization with the first touch driving IC 212.

The touch sensing IC 220 senses touch signals of the receiving electrode lines 118 of the first touch group 110 and touch signals of the receiving electrode lines 128 of the second touch group 120 along with the driving of the first and second touch driving ICs 212 and 214. In this case, an operation of sensing the touch signals of the receiving electrode lines 118 of the first touch group 110 and the touch signals of the receiving electrode lines 128 of the second touch group 120 is sequentially performed in units of one line.

Figure 9:
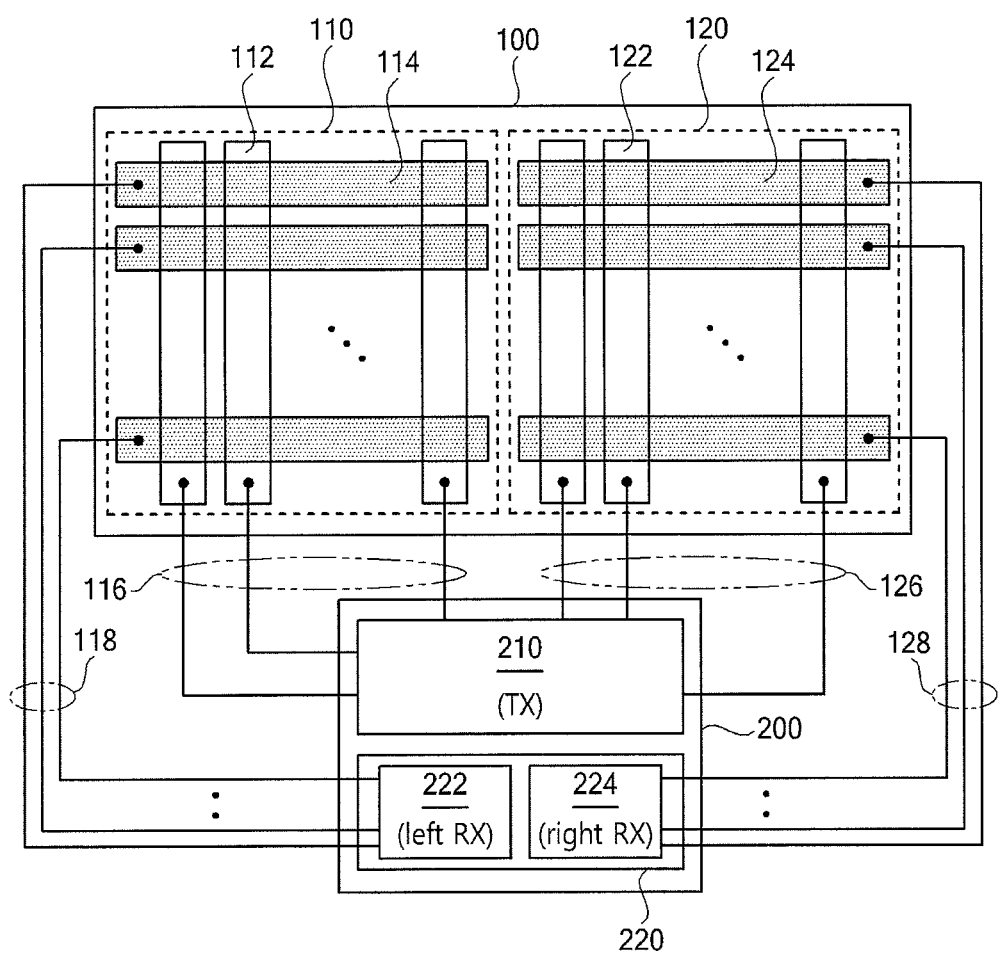
FIG. 9 is a diagram illustrating a display device integrated with a touch screen according to a sixth embodiment of the present invention.

Next, FIG. 9 is a diagram illustrating a display device integrated with a touch screen according to a sixth embodiment of the present invention. The display device integrated with the touch screen according to the sixth embodiment of the present invention includes a touch driver 200 that is configured with one touch driving IC 210 and two touch sensing ICs 220. A touch electrode, a plurality of driving electrode lines 116 and 126, and a plurality of receiving electrode lines 118 and 128, which are formed in a display panel 100, are the same as or similar to the embodiments described above with reference to FIGS. 3 to 7.

The frame-unit time division driving method described above with reference to FIG. 4 and the line-unit time division driving method described above with reference to FIGS. 5 and 7 may be applied to the display device integrated with the touch screen according to the sixth embodiment of the present invention.

The touch driving IC 210 simultaneously supplies a touch driving signal to driving electrodes 112 of a first touch group 110 and driving electrodes 122 of a second touch group 120. In this case, the touch driving signal is sequentially supplied in units of a driving electrode line TX. In detail, the touch driving IC 210 simultaneously supplies the touch driving signal to a first driving electrode line TX1 of the first touch group 110 and a first driving electrode line TX(k+1) of the second touch group 120. The touch driving signal is supplied to a driving electrode connected to the first driving electrode line TX1 of the first touch group 110. Simultaneously, the touch driving signal is supplied to a driving electrode connected to the first driving electrode line TX(k+1) of the second touch group 120.

Subsequently, the touch driving IC 210 simultaneously supplies the touch driving signal to a second driving electrode line TX2 of the first touch group 110 and to a second driving electrode line TX(k+2) of the second touch group 120. The touch driving signal is supplied to a driving electrode connected to the second driving electrode line TX2 of the first touch group 110. Simultaneously, the touch driving signal is supplied to a driving electrode connected to the second driving electrode line TX(k+2) of the second touch group 120. In this way, the touch driving IC 210 sequentially supplies the touch driving signal up to a last driving electrode line TXk of the first touch group 110 and a last driving electrode line TX(2k) of the second touch group 120.

The first touch sensing IC 222 is connected to first receiving electrode lines 118 of the first touch group 110 which is formed at the left of a screen of the display panel 100. The second touch sensing IC 224 is connected to second receiving electrode lines 128 of the second touch group 120 which is formed at the right of the screen of the display panel 100.

An operation of sensing touch signals of the first receiving electrode lines 118 of the first touch group 110 and touch signals of the second receiving electrode lines 128 of the second touch group 120 is sequentially performed in units of a receiving electrode line RX. In this case, the first and second touch sensing ICs 222 and 224 sense the touch signals in units of one receiving electrode line in synchronization with each other.

In detail, the first touch sensing IC 222 senses a touch signal of a first receiving electrode line RX1 of the first touch group 110. Simultaneously, the second touch sensing IC 224 senses a touch signal of a first receiving electrode line RX(n+1) of the second touch group 120.

Subsequently, the first touch sensing IC 222 senses a touch signal of a second receiving electrode line RX2 of the first touch group 110. Simultaneously, the second touch sensing IC 224 senses a touch signal of a second receiving electrode line RX(n+2) of the second touch group 120. In this way, the first touch sensing IC 222 sequentially senses touch signals of the receiving electrode lines 118 in units of one line up to a last receiving electrode line RXn of the first touch group 110. Simultaneously, the second touch sensing IC 224 sequentially senses touch signals of the receiving electrode lines 128 in units of one line up to a last receiving electrode line RX(2n) of the second touch group 120.

Figure 10:
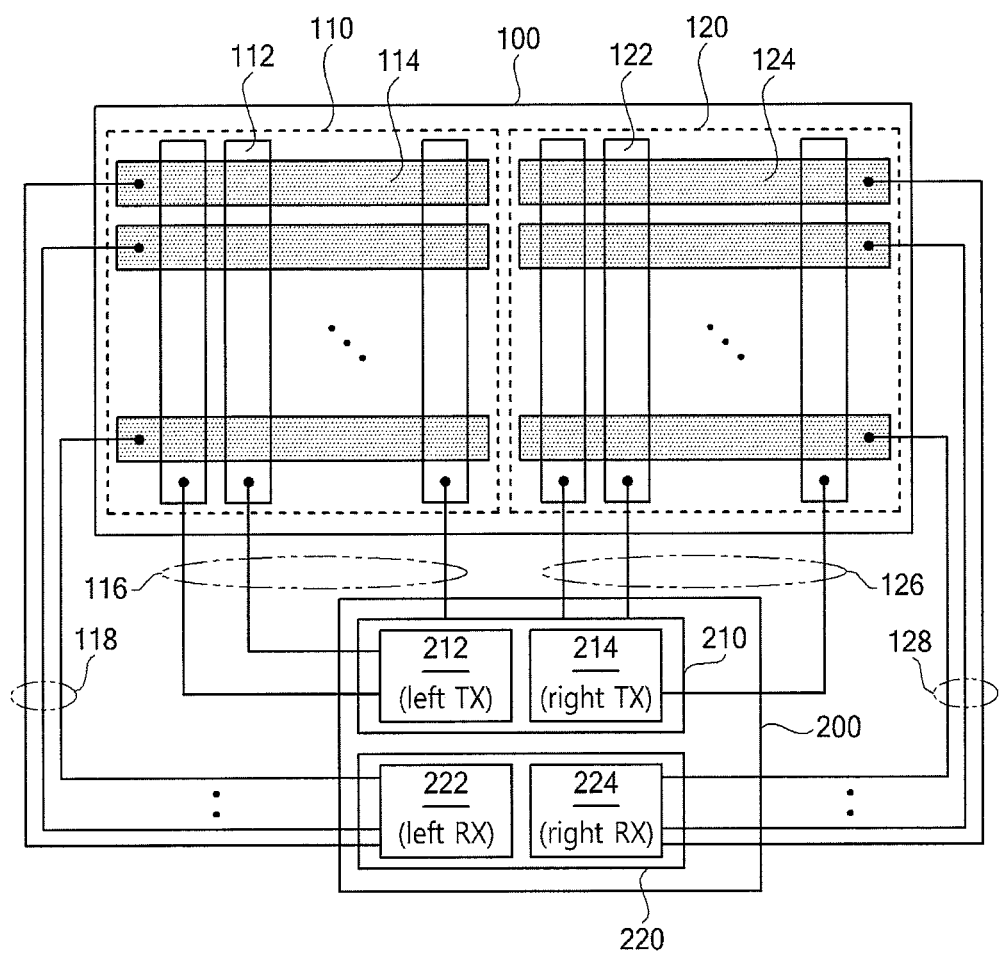
FIG. 10 is a diagram illustrating a display device integrated with a touch screen according to a seventh embodiment of the present invention.

Next, FIG. 10 is a diagram illustrating a display device integrated with a touch screen according to a seventh embodiment of the present invention. The display device integrated with the touch screen according to the seventh embodiment of the present invention includes a touch driver 200 that is configured with two touch driving ICs 212 and 214 and two touch sensing ICs 222 and 224.

A touch electrode, a plurality of driving electrode lines 116 and 126, and a plurality of receiving electrode lines 118 and 128, which are formed in a display panel 100, are the same as or similar to the embodiments described above with reference to FIGS. 3 to 7, and thus, their detailed descriptions are not provided.

The frame-unit time division driving method described above with reference to FIG. 4 and the line-unit time division driving method described above with reference to FIGS. 5 and 7 may be applied to the display device integrated with the touch screen according to the seventh embodiment of the present invention.

The first touch driving IC 212 is connected to the first driving electrode lines 116 of a first touch group 110 which is formed at the left of a screen of the display panel 100. The second touch driving IC 214 is connected to the second driving electrode lines 126 of a second touch group 120 which is formed at the right of the screen of the display panel 100.

The first and second touch driving ICs 212 and 214 supply a touch driving signal in units of one driving electrode line in synchronization with each other. In detail, the first touch driving IC 212 supplies the touch driving signal to a first driving electrode line TX1 of the first touch group 110. Simultaneously, the second touch driving IC 214 supplies the touch driving signal to a first driving electrode line TX(k+1) of the second touch group 120.

The touch driving signal is supplied to a driving electrode connected to the first driving electrode line TX1 of the first touch group 110. Simultaneously, the touch driving signal is supplied to a driving electrode connected to the first driving electrode line TX(k+1) of the second touch group 120.

Subsequently, the first touch driving IC 212 supplies the touch driving signal to a second driving electrode line TX2 of the first touch group 110. Simultaneously, the second touch driving ICA 214 supplies the touch driving signal to a second driving electrode line TX(k+2) of the second touch group 120.

The touch driving signal is supplied to a driving electrode connected to the second driving electrode line TX2 of the first touch group 110. Simultaneously, the touch driving signal is supplied to a driving electrode connected to the second driving electrode line TX(k+2) of the second touch group 120. In this way, the first touch driving IC 212 sequentially supplies the touch driving signal up to a last driving electrode line TXk of the first touch group 110. Also, the second touch driving IC 214 sequentially supplies the touch driving signal up to a last driving electrode line TX(2k) of the second touch group 120 in synchronization with the first touch driving IC 212.

The first touch sensing IC 222 is connected to the first receiving electrode lines 118 of the first touch group 110 which is formed at the left of the screen of the display panel 100. The second touch sensing IC 224 is connected to the second receiving electrode lines 128 of the second touch group 120 which is formed at the right of the screen of the display panel 100.

When the first touch driving IC 212 is driven, the first touch sensing IC 222 senses touch signals of the receiving electrode lines 118 of the first touch group 110. When the second touch driving IC 214 is driven, the second touch sensing IC 224 senses touch signals of the receiving electrode lines 128 of the second touch group 120.

An operation of sensing touch signals of the first receiving electrode lines 118 of the first touch group 110 and touch signals of the second receiving electrode lines 128 of the second touch group 120 is sequentially performed in units of a receiving electrode line RX. In this case, the first and second touch sensing ICs 222 and 224 sense the touch signals of the first receiving electrode lines 118 and the second receiving electrode lines 128 in units of one receiving electrode line in synchronization with each other. In detail, the first touch sensing IC 222 senses a touch signal of a first receiving electrode line RX1 of the first touch group 110. Simultaneously, the second touch sensing IC 224 senses a touch signal of a first receiving electrode line RX(n+1) of the second touch group 120.

Subsequently, the first touch sensing IC 222 senses a touch signal of a second receiving electrode line RX2 of the first touch group 110. Simultaneously, the second touch sensing IC 224 senses a touch signal of a second receiving electrode line RX(n+2) of the second touch group 120. In this way, the first touch sensing IC 222 sequentially senses touch signals in units of one line up to a plurality of receiving electrodes connected to a last receiving electrode line RXn of the first touch group 110. Simultaneously, the second touch sensing IC 224 sequentially senses touch signals in units of one line up to a plurality of receiving electrodes connected to a last receiving electrode line RX(2n) of the second touch group 120.

As described above, in the display device integrated with the touch screen according to the embodiments of the present invention, the first and second touch groups 110 and 120 are formed by physically dividing (two division) all the touch electrodes. In a non-display period, the first and second touch groups 110 and 120 are driven as separate touch screens. The first touch group 110 senses a touch of an area corresponding to a left side (i.e., half (½)) of a whole screen of the display panel 100. The second touch group 120 senses a touch of an area corresponding to a right side (i.e., the other half (½)) of a whole screen of the display panel 100.

Hereinabove, it has been described that the first and second touch groups 110 and 120 are formed by physically dividing all the touch electrodes of the display panel 100 into two groups. However, the above descriptions have been made on some of various embodiments of the present invention.

Figure 11:
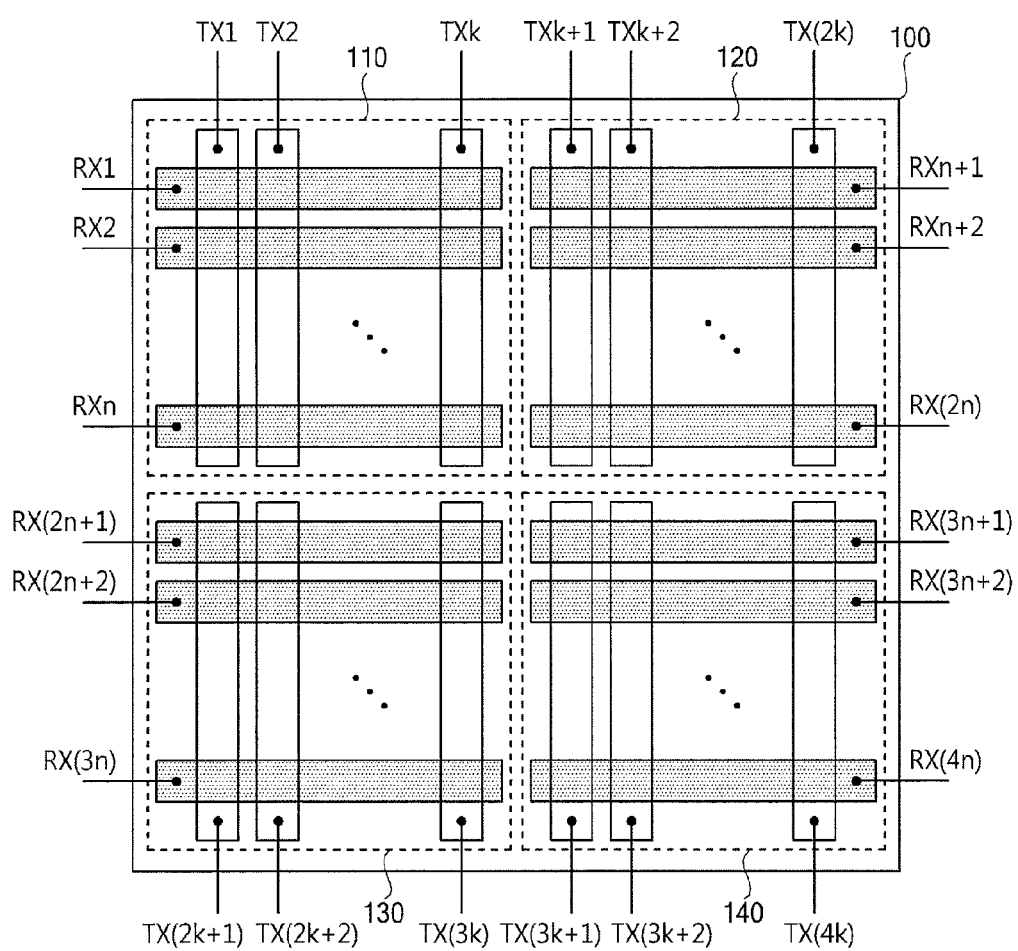
FIG. 11 is a diagram illustrating a display device integrated with a touch screen according to an eighth embodiment of the present invention.

Next, FIG. 11 is a diagram illustrating a display device integrated with a touch screen according to an eighth embodiment of the present invention. In the display device integrated with the touch screen according to the eighth embodiment of the present invention, first to fourth touch groups 120, 130, 140 and 150 may be formed by physically dividing all the touch electrodes of the display panel 100 into five groups. In a non-display period, the first to fourth touch groups 120, 130, 140 and 150 may be driven as separate touch screens. In this case, a touch driving signal is simultaneously supplied to the first to fourth touch groups 120, 130, 140 and 150, and touch signals of the first to fourth touch groups 120, 130, 140 and 150 are simultaneously sensed.

The frame-unit time division driving method described above with reference to FIG. 4 and the line-unit time division driving method described above with reference to FIGS. 5 and 7 may be applied to the display device integrated with the touch screen according to the eighth embodiment of the present invention.

The first to fourth touch groups 120, 130, 140 and 150 simultaneously sense four areas which each correspond to one-fourth (¼) of a whole screen of the display panel 100, respectively, and thus can reduce a time expended in sensing a touch.

Because all the touch electrodes are physically divided into four groups, a parasitic capacitance of each touch electrode is reduced by one-fourth. Accordingly, a size of a display panel can be enlarged while still maintaining good touch sensing performance.

In the display device integrated with the touch screen and the driving method thereof according to the embodiments of the present invention, the parasitic capacitance of the display panel integrated with the touch screen is reduced, thereby enhancing touch sensing performance.

Moreover, in the display device integrated with the touch screen and the driving method thereof according to the embodiments of the present invention, the parasitic capacitance is reduced, thereby enlarging a size of the display panel integrated with the touch screen.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device including a plurality of touch electrodes formed in a display panel in an in-cell touch type touch screen, the display device comprising:
   a plurality of first driving electrode lines connected to a plurality of driving electrodes of a first touch group of a plurality of touch groups;
   a plurality of second driving electrode lines connected to a plurality of driving electrodes of a second touch group of the plurality of touch groups;
   a plurality of first receiving electrode lines connected to a plurality of receiving electrodes of the first touch group;
   a plurality of second receiving electrode lines connected to a plurality of receiving electrodes of the second touch group;
   a touch driving IC (Integrated Circuit) configured to supply a touch driving signal to the plurality of first driving electrode lines and the plurality of second driving electrode lines; and
   a touch sensing IC configured to sense touch signals of the plurality of first receiving electrode lines and touch signals of the plurality of second receiving electrode lines,
   wherein both the plurality of first driving electrode lines and the plurality of second driving electrode lines are individually connected to one touch driving IC,
   wherein both the plurality of first receiving electrode lines and the plurality of second receiving electrode lines are individually connected to one touch sensing IC,
   wherein one frame is divided into a display period in which a display operation is performed and a non-display period in which a touch sensing operation is performed,
   wherein an operation frequency of the touch sensing operation is n-times higher than an operation frequency of the display operation when the number of the touch groups is n, where n is a natural number greater than 1,
   wherein a common electrode formed for supplying a common voltage to each pixel is used as one between the plurality of driving electrodes and the plurality of receiving electrodes, and the other between the plurality of driving electrodes and the plurality of receiving electrodes which are separately formed, and wherein the plurality of driving electrodes are formed on a first layer different from a second layer on which the plurality of receiving electrodes are formed.

2. The display device of claim 1, wherein the touch driving IC simultaneously supplies the touch driving signal to the plurality of first driving electrode lines of the first touch group and the plurality of second driving electrode lines of the second touch group.

3. The display device of claim 2, wherein the touch driving IC sequentially supplies the touch driving signal to the first driving electrode lines of the first touch group, and simultaneously, sequentially supplies the touch driving signal to the second driving electrode lines of the second touch group.

4. The display device of claim 1, wherein the touch sensing IC simultaneously senses touch signals of the plurality of first receiving electrode lines of the first touch group and touch signals of the plurality of second receiving electrode lines of the second touch group.

5. The display device of claim 4, wherein the touch sensing IC sequentially senses the touch signals of the plurality of first receiving electrode lines of the first touch group, and simultaneously, sequentially senses the touch signals of the plurality of second receiving electrode lines of the second touch group.

6. The display device of claim 1, wherein the touch driving IC includes:
a first touch driving IC configured to supply the touch driving signal to the plurality of first receiving electrode lines of the first touch group; and
a second touch driving IC configured to supply the touch driving signal to the plurality of second receiving electrode lines of the second touch group.

7. The display device of claim 1, wherein the touch sensing IC includes:
a first touch sensing IC configured to sense touch signals of the plurality of first receiving electrode lines of the first touch group; and
a second touch sensing IC configured to sense touch signals of the plurality of second receiving electrode lines of the second touch group.

8. The display device of claim 1, wherein the touch driving IC includes a first touch driving IC and a second touch driving IC, and
wherein the touch sensing IC includes a first touch sensing IC and a second touch sensing IC.

9. The display device of claim 1, wherein the touch driving IC supplies the touch driving signal during the non-display period, and the touch sensing IC simultaneously senses the touch signals during the non-display period.

10. The display device of claim 1, wherein the first touch group is used to sense a touch input to a left half of the touch screen, and the second touch group is used to sense a touch input to a right half of the touch screen.

11. A method of driving a display device including a plurality of touch electrodes foamed in a display panel in an in-cell touch type touch screen, the method comprising:
during a display period, displaying an image in a plurality of pixels formed in the display panel;
during a non-display period, supplying a touch driving signal to a plurality of driving electrodes of a first touch group among a plurality of touch groups and connected to a plurality of first driving electrode lines, and simultaneously supplying the touch driving signal to a plurality of driving electrodes of a second touch group among the plurality of touch groups and connected to a plurality of second driving electrode lines; and
sensing touch signals of a plurality of receiving electrode lines of the first touch group, and simultaneously sensing touch signals of a plurality of receiving electrode lines of the second touch group,
wherein both the plurality of first driving electrode lines and the plurality of second driving electrode lines are individually connected to one touch driving IC (Integrated Circuit),
wherein both the plurality of first receiving electrode lines and the plurality of second receiving electrode lines are individually connected to one touch sensing IC,
wherein one frame is divided into the display period in which a display operation is performed and the non-display period in which a touch sensing operation is performed,
wherein an operation frequency of the touch sensing operation is n-times higher than an operation frequency of the display operation when the number of the touch groups is n, where n is a natural number greater than 1,
wherein a common electrode formed for supplying a common voltage to each pixel is used as one between the plurality of driving electrodes and the plurality of receiving electrodes, and the other between the plurality of driving electrodes and the plurality of receiving electrodes which are separately formed, and
wherein the plurality of driving electrodes are formed on a first layer different from a second layer on which the plurality of receiving electrodes are formed.

12. The method of claim 11, further comprising:
sequentially supplying the touch driving signal to the first driving electrode lines of the first touch group, and simultaneously sequentially supplying the touch driving signal to the second driving electrode lines of the second touch group.

13. The method of claim 11, further comprising:
sequentially sensing the touch signals of the plurality of first receiving electrode lines of the first touch group, and simultaneously sequentially sensing the touch signals of the plurality of second receiving electrode lines of the second touch group.

14. The method of claim 11, wherein the first and second touch groups are simultaneously driven to sense touch signals of two channels of a touch sensing IC.

15. The method of claim 11, wherein a display operation and the touch sensing operation are performed in the display period and the non-display period into which one horizontal period is divided, respectively.

16. The method of claim 11, further comprising:
driving a first touch sensing IC to sense a touch signal of the plurality of first receiving electrode lines of the first touch group; and
simultaneously driving a second touch sensing IC to sense a touch signal of the plurality of second receiving electrode lines of the second touch group.

17. The method of claim 11, further comprising:
driving a first touch driving IC to sense touch signals of the plurality of first receiving electrode lines of the first touch group; and
driving a second touch driving IC to sense touch signals of the plurality of second receiving electrode lines of the second touch group.

18. The method of claim 11, wherein the first touch group is used to sense a touch input to a left half of the touch screen, and the second touch group is used to sense a touch input to a right half of the touch screen.

* * * * *